United States Patent Office 3,667,965
Patented June 6, 1972

3,667,965
BAKED FLOUR COMPOSITIONS CONTAINING ALIPHATIC DIOLS
John W. Frankenfeld, Atlantic Highlands, N.J., and Marcus Karel, Newtonville, and Theodore P. Labuza, North Tewksbury, Mass., assignors to Esso Research and Engineering Company
No Drawing. Filed Jan. 20, 1970, Ser. No. 4,427
Int. Cl. A21d 2/14
U.S. Cl. 99—90 P                         11 Claims

ABSTRACT OF THE DISCLOSURE

This invention relates to baked flour compositions which comprise certain aliphatic polyalcohols such as 1,3-diols and 1,3,5, x-polyols. These baked flour compositions containing aliphatic diols have excellent anti-staling properties and greatly improved storage properties due to mold inhibition. In addition, since they are energy dense compounds which are rapidly and completely metabolized, they improve the nutritional qualities of the product.

---

The present invvention is concerned generally with high quality baked flour compositions such as breads, cakes, rolls and the like and is more specifically concerned with the use of particular aliphatic diols as bread additives.

It is known in the baking art to include various additives or conditioners to dough before it is baked in order to impart desirable properties to the final product. Such properties include good grain structure, crumb softness, loaf volume, color and texture. Especially desirable are additives which improve the shelf life of baked goods by retarding staling and preventing spoilage due to mold growth. In addition to being effective for the desired purpose, such additives must be safe (i.e. nontoxic) and must not adversely affect the other properties of the baked goods or interfere with the action of other components of the composition.

It has now been discovered that if particular aliphatic diols are used as additives in breads or other baked goods an excellent, high quality, high energy food product results. The bread product has outstanding anti-staling properties and excellent mold inhibition properties. These aliphatic diols, such as aliphatic 1,3-diols of 3 carbon atoms or more are nontoxic, energy-dense compounds which are very excellent when utilized for the production of a high quality bakery product. These compounds have advantages over current additives not only because of increased effectiveness, but also because they are safer to use. In addition to improving the shelf life of baked goods, they actually improve the nutritive properties of the product.

These aliphatic 1,3-diols and 1,3,5, x-polyols, in addition to providing anti-staling properties, also provide excellent sources of metabolic energy for humans and animals. These additive materials are synthesized easily, they have very desirable properties, and are readily metabolized. These materials have several advantages over usual energy sources in that they are higher in caloric density than carbohydrates and proteins and are more stable than fats and thus may be used as replacements for natural foods. The diols are colorless, virtually odorless and tasteless and are easily formulated into various bread and other baked products. Since they are produced by chemical means from readily obtainable starting materials, they have advantages in that they are available at stable prices and inconsistent quantities. They also may be produced readily in localities where arable land for grazing or cultivation is scarce.

Bread as used in the present application is a food product made of flour or meal with liquid shortening and leavening, which is kneaded, shaped, allowed to rise and baked. Thus, the bread product of the present invention is one where usually, prior to baking, the dough is treated to render it light and porous. This may be secured by beating, or with yeast or leavening or a baking powder.

The particular polyols of the present invention are stable under baking temperatures in the range of about 300° F. to 450° F. These linear polyols contain from about 3 to 15 carbon atoms in the molecule, preferably about 3 to about 10 carbon atoms in the molecule. The polyols of the present invention contain hydroxy groups on at least the first and third carbon atoms of the molecule. The polyols may contain hydroxy groups on the first, third, fifth, etc., carbon atoms. It is this 1,3-dihydroxy or 1,3,5, x-polyhydroxy configuration which renders these compounds very useful as bread additives because of their inherent safety. Polyalcohols with hydroxyl groups in other positions on the carbon chain are toxic and, therefore, are not useful bread additives. In addition to being nontoxic and readily metabolized the 1,3-diols and 1,3,5, x-polyols claimed herein have certain other advantages making them highly desirable as foods and food additives: (1) they are stable, nonvolatile oils and have a long storage and shelf life; (2) they have an appreciable water solubility and are readily emulsified making them easy to formulate in bread preparations; (3) they are readily absorbed in the intestinal tract; and (4) they have a high caloric density; i.e., they afford a large number of calories on being metabolized for a given weight or volume of the compound. A summary of the compounds specifically claimed in this invention along with their caloric densities and some of their physical properties, is presented in Table I.

TABLE I

| Diol | B.P., °C. (mm.) | Taste, odor, etc. | Theoretical caloric density, kcal./gm.[1] |
|---|---|---|---|
| 1,3-butanediol | 202–203 | Colorless, sweet odor, bitter taste. | 6.7 |
| 1,3-pentanediol | 78–81(0.5) | ....do............... | 7.4 |
| 1,3-hexanediol | 81–82(0.2) | Colorless, slight musty odor, bitter taste. | 7.8 |
| 1,3-heptanediol | 90(0.5) | Colorless, slight musty odor, slight bitter taste. | 8.2 |
| 1,3-octanediol | 87–89(0.3) | ....do............... | 8.5 |
| 1,3-nonanediol | 126(1.1) | ....do............... | 8.7 |
| 1,3-decanediol | [2] 30–31 | ....do............... | 8.9 |
| 1,3-undecanediol | [2] 41–42 | ....do............... | 9.1 |
| 1,3,5-hexanetriol | 130–132(0.2) | ....do............... | 6.6 |

[1] Caloric density is the theoretically available energy in kilocarlories per gram of the compound.
[2] Melting point.

It is apparent from the above data that the 1,3-diols and 1,3,5, x-polyols are energy dense compounds with desirable physical properties. Of the common foods (protein: 4.1 kcal./gm.: carbohydrate: 4.1 kcal./gm.: and fat: 9.3 kcal./gm.) only fats have caloric densities comparable to these polyalcohols.

All compounds listed in Table I are viscous, nonvolatile oils. These properties render them stable under baking temperatures and they are easy to incorporate into bread dough compositions. For these reasons, as well as those enumerated in the foregoing, 1,3-diols and 1,3,5, x-polyols are superior anti-staling agents and antimold agents and are energy sources which can serve as replacements for carbohydrates or fats in human and animal diets.

While these materials may be prepared by any satisfactory method, the following methods are very satisfactory for their preparation.

The Reformatsky reaction followed by reduction:

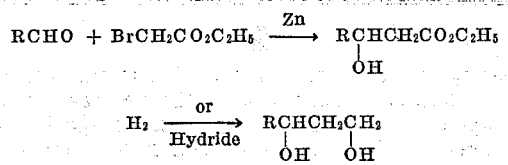

or by means of the Prins reaction of formaldehyde and the appropriate α olefin or mixtures of α olefins:

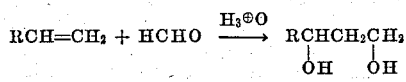

The 1,3,5-hexanetriol has been synthesized by the following sequence of reactions:

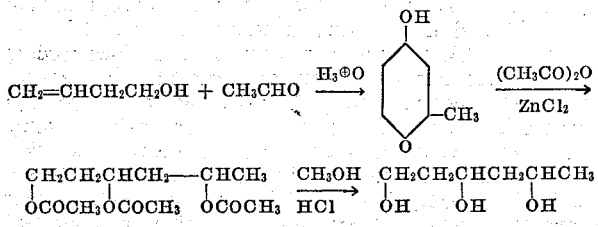

Other 1,3,5, x-polyols (polyvinyl alcohols) of medium molecular weight may also be obtained by selective polymerization of acetaldehyde followed by reduction:

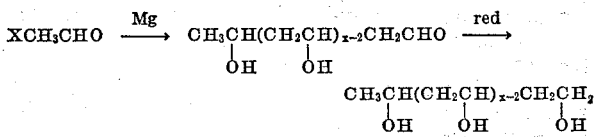

As pointed out heretofore, the compounds of the present invention are food supplements and are incorporated in bread compositions. The amount of these polyols used may vary from about 0.2% to about 3.0% by dry weight of the flour or meal. Preferably, the amount of additive used should be in the range from about 0.5% to about 1.5%, such as about 1.0% based on the dry weight of the flour.

In order to further illustrate the invention, various tests were carried out, the results of which are described in the following examples and tables of data. In Table II are summarized the results of toxicity measurements and nutritional evaluations. These studies were conducted with rats.

TABLE II.—NUTRITIONAL AND TOXICITY DATA FOR VARIOUS POLYOLS

| Compound | Polyols | Oral LD$_{50}$ (7 days) [1],[2] g./kg. | Observed metabolic energy, kcal./g. | Percent utilized [3] |
|---|---|---|---|---|
| 1 | 1,3-butanediol | 29 | 6.0 | 88 |
| 2 | 1,3-pentanediol | >20 | 7.8 | 100 |
| 3 | 1,5-pentanediol | 2 | [4] N.U. | |
| 4 | 1,3-hexanediol | >20 | 6.6 | 85 |
| 5 | 1,5-hexanediol | >20 | [4] N.U. | |
| 6 | 2,5-hexanediol | 2 | [4] N.U. | |
| 7 | 1,6-hexanediol | 5 | [4] N.U. | |
| 8 | 1,3-heptanediol | >20 | 8.0 | 98 |
| 9 | 1,3-octanediol | >20 | 5.8 | 71 |
| 10 | 1,3-nonanediol | >20 | 7.5 | 85 |
| 11 | 1,3-decanediol | >20 | | |
| 12 | 1,3-undecanediol | >20 | | |
| 13 | 1,3,5-hexanetriol | 25 | | |

[1] Single dose in rats.
[2] LD$_{50}$=lethal dose for 50% kill.
[3] Determined by dividing observed calories by theoretical calories.
[4] N.U.=Not utilized.

It is apparent from the above data that the positioning of the hydroxyl groups has a very significant effect on the toxicity of these compounds and on their ability to be metabolized. Having hydroxyl groups on the first and third carbon atoms of the chain is sufficient to reduce the toxicity and render the compounds metabolizable.

LD$_{50}$ values are a common measure of the toxicity of a compound. These LD$_{50}$ values represent the lethal dose for a 50% kill of the animals tested per unit weight of the animals. The higher the LD$_{50}$ value, the lower the toxicity. The data in Table II establish that the 1,3 configurations, and especially the 1,3,5, x-configurations of polyalcohols, are the least toxic. The LD$_{50}$ values are significantly higher in compounds possessing this structural feature. The LD$_{50}$ values given in Table II were obtained by giving test animals graded single doses of the test compounds orally and observing them for one week. The number of deaths in each group was noted and the dose required for a 50% kill taken as the LD$_{50}$ value. In many cases, no death occurred even at the 20 g./kg. level (about as much as one can give a rat in one dose), hence the basis of the ">20" values shown in the table.

The LD$_{50}$ values for some common materials currently used as preservatives in baked goods are shown in Table III. These values are lower than those obtained with 1,3-diols. Thus, the diols claimed herein are significantly less toxic than current additives and can be used at higher levels in foods if desired.

TABLE III

| Preservative | Oral LD$_{50}$ g./kg. | Source |
|---|---|---|
| Sorbic acid | 10 | [1] |
| Sodium sorbate | 6-7 | [1] |
| Sodium benzoate | 2-3 | [1] |
| Propionic acid | 4 | [2] |

[1] Handbook of Toxicology, Vol. I.
[2] H. F. Smyth, Jr., et al., Am. Ind. Hygiene Assoc. J., 23, 95 (1962).

The "observed metabolic energy" values shown in Table II were obtained by feeding test groups, of 5–10 rats each, various amounts of several high energy supplements including the 1,3-diols and 1,3,5, x-polyols. The basal diets in each case contained sufficient protein, salts, vitamins and minerals to support normal growth. However, the basal diets were deficient in energy (calorides). This deficit was, in part, overcome by adding varying amounts of polyols or of natural energy sources of known caloric densities such as lard, sucrose, or glucose. Curves were drawn by plotting the average change in body weight of test animals against the amount of high energy supplement tested and straight lines were obtained. The slopes of the lines are measures of the energy values of the test compounds. The values given in Table II were obtained by measuring the slopes of the lines of the test compounds and comparing them with the slopes of the lines obtained with the standards (lard, glucose or sucrose whose caloric densities are 9.3 kcal./gm., 3.8 kcal./gm. and 4.1 kcal./gm., respectively). The "observed metabolic energy" values were calculated according to the formula:

$$\text{kcal./gm. of Unknown} = \frac{\text{Slope of unknown line}}{\text{Slope of standard line}} \times \text{kcal/gm. of standard}$$

In order to further illustrate the invention, the following examples are given:

EXAMPLE 1

In order to demonstrate the effectiveness of the present additives, bread was baked with, and without added compounds, as follows:

The "sponge" method of baking was used, which consisted of the following steps:

(1) A "sponge" was prepared by mixing the ingrients listed below:

| | Grams |
|---|---|
| Flour | 225 |
| Salt (NaCl) | 0.3 |
| Yeast food (NH$_4$Cl) | 0.15 |
| Baker's yeast | 7.15 |
| Water | 100 |

All of the above ingredients were mixed for two minutes in the mixing bowl of a standard experimental mixer (Farinograph) equipped with instruments for measuring and recording of resistance of the dough to mixing.

(2) After mixing, the "sponge" was allowed to ferment for 3.5 hours, at 86° F.

(3) After fermentation the additional ingredients of the dough were added as follows:

Sponge was placed in the mixing bowl, and added to it by mixing for 0.5 minute were:

|  | Grams |
|---|---|
| Flour | 75 |
| Salt | 5.7 |
| Sugar (sucrose) | 18 |
| Non-fat milk solids | 12 |

(4) 50 ml. of water were then added. When additives were used they were added with this water, after mixing in the water to form a solution, or dispersion, depending on additive solubility. The additives were added in quantities of 1.5 g. (0.5% level) or 3.0 g. (1% level).

(5) The dough was then mixed at low speed for 1.5 minutes.

(6) Mixing was stopped and the shortening: hydrogenated vegetable shortening, 9 grams were added.

(7) Mixer was started at high speed, and after 2–3 minutes additional water was added, to give a standardized resistance to mixing. The amount added was designed to give a maximum consistency of 500 Brabender Units as measured with Farinograph. This procedure is in accordance with test baking practice.

Mixing was continued for three minutes past the time at which maximum consistency was reached. Typically, a total mixing time of 12 minutes resulted.

(8) Dough was taken from the mixing bowl and "rested" in grease pots at 86° F., for one hour.

(9) Dough was divided into 150 gram portions and "pup loaves" formed using standard equipment (Brabender Extensograph).

(10) The loaves were then placed in greased "pup pans" and proofed to constant height of ⅜″ above the pan line in a box maintained at 96 to 98° F. at 80 to 90% R.H.

(11) After proofing the loaves were baked in rotary baking oven at 425° F. The baking time was usually 20 minutes.

The loaves thus obtained were stored for several days and then evaluated for freshness (anti-staling properties). Loaves with various additives were compared with controls. The degree of staling was determined by measuring, with a sensitive cathetometer, the depth of penetration by a plunger into slices of test loaves when known weights were placed on the plunger. The greater the penetration the fresher the bread. The results are given in Table IV.

TABLE IV

| Additive | Penetration of plunger of specified weight into bread after four days of storage (cm.)* | |
|---|---|---|
|  | 400 g. plunger, mean | 600 g. plunger, mean |
| None | 0.138 | 0.244 |
| 1,3-butanediol (0.5 g./100 g. flour) | 0.226 | 0.314 |
| 1,3-heptanediol (0.5 g/100 g. flour) | 0.195 | 0.277 |

*The deeper the plunger penetration the fresher the bread.

From the above, it is apparent that the anti-staling property of the bread was greatly improved.

EXAMPLE 2

Tests were conducted to determine what effects these diols might have on other characteristics of bread. Loaves were baked as in Example 1 and graded according to a standard procedure (overall score in Table V). In addition the average bulk densities and volumes were measured. Results are given in Table V.

TABLE V.—EFFECTS OF DIOLS ON BREAD QUALITY

| Treatment | Overall score (100 maximum) | Average bulk density (g./cm.³) | Average bulk volume (in 3/oz.) | Days to first appearance of mold |
|---|---|---|---|---|
| Control | 88.5 | 0.204 | 8.48 | 6 |
| 1,3-butanediol (0.5% of flour weight) | 92.5 | 0.206 | 8.40 | 6 |
| 1,3-heptanediol (0.5% of flour weight) | 90.0 | 0.208 | 8.33 | 11 |

From the above, it is apparent that at the level of 0.5% in flour, the diols had no adverse effect on bread quality, i.e. density, flavor, volume and crumb structure but did have a definite positive effect on inhibiting mold formation.

Also, at the one percent level, 1,3-heptanediol kept bread mold-free for more than six weeks while control loaves, with no added diol, were moldy in less than a week.

EXAMPLE 3

In order to evaluate the effectiveness of a 1,3-diol as compared with known preservatives as a mold inhibitor, the following experiments were performed:

Nutrient broth was used as the basal nutrient medium for the growth of all microorgansms tested. Five ml. of nutrient broth medium were placed in 18 mm. x 150 mm. test tubes and the basal medium sterilized with steam at 15 p.s.i. for 15 minutes. After cooling, a sufficient amount of the various compounds were added to the basal medium to give the concentrations used. Final concentrations of 0.2, 1, and 2% were used.

After mixing the chemicals with nutrient broth, the tubes were inoculated with the various test microorganisms. The test microorganisms were grown 24 hours earlier in nutrient broth and 1 drop of the dense microbial suspension was added to the tubes.

The tubes containing the chemicals and microorganisms were then incubated at the optimal growth temperature reported for each microorganism tested. Eith 37° C. or 30° C. was used. Growth in control tubes, as well as those containing chemicals, was observed visually. After a suitable incubation period, a small aliquot of the test solutions was streaked on an agar plate. This was done in order to confirm the visual readings of the presence of microbial growth. Results are shown in Table VI. They are given as the minimum concentration of additive which was effective in suppressing mold growth.

TABLE VI.—COMPARISON OF 1,3 HEPTANEDIOL WITH KNOWN PRESERVATIVES AGAINST VARIOUS MOLDS

| Compound | Minimum effective concentration (percent) against— | | | | | |
|---|---|---|---|---|---|---|
|  | Trichod. 12688 | P. roquef. 6988 | Fusarium 10911 | B. fulva | A. niger | A. flavus |
| 1,3 Heptanediol | 1 | 0.2 | 1 | 0.2 | 0.2 | 1 |
| Potassium sorbate | 2 | 0.2 | 2 | 2 | 2 | 2 |
| Calcium propionate | + | 0.2 | + | + | + | + |

Symbols: +=no effect at 2%.

From the above, it is readily apparent that 1,3-heptanediol is a very effective anti-mold agent.

Thus, the present invention is concerned with improved baked flour formulations containing aliphatic diols. These bread compositions containing various 1,3-diols in concentrations of about 0.1% to about 5.0%, preferably 0.2 to 3.0% based on the dry weight of flour have no adverse effect on the rheological properties of dough, and have very beneficial effects on the shelf life of the product.

What is claimed is:

1. Baked flour composition having anti-staling and mold inhibition properties containing from about 0.1 to 5.0% by weight based on the dry weight of the flour of an aliphatic hydroxy compound containing from about 3 to 15 carbon atoms in the chain, said compound characterized by containing hydroxy groups only on the odd number carbon atoms and further characterized by having hydroxy groups in at least the first and third carbon atom.

2. Baked flour composition having anti-staling and mold inhibition properties containing from about 0.2 to 3.0% by weight based on dry flour of a 1.3 aliphatic diol having from about 3 to 15 carbon atoms in the molecule.

3. Composition as defined by claim 2 wherein said diol contains from about 3 to 10 carbon atoms in the molecule.

4. Composition as defined by claim 2 wherein said composition contains from about 0.5 to 1.5% by weight of 1,3 butanediol.

5. Composition as defined by claim 2 wherein said composition contains from about 0.5 to 1.5% by weight of 1,3 heptanediol.

6. Composition as defined by claim 1 wherein said composition contains from about 0.5 to 1.5% by weight of 1,3,5 hexanetriol.

7. Method of producing a high quality bread composition which comprises adding to flour or meal from about 0.2 to 3.0% by weight of a 1,3 aliphatic diol having from about 3 to 15 carbon atoms in the molecule, kneading the composition and thereafter baking at a temperature in the range from about 300° F. to about 450° F.

8. Method as defined by claim 7 wherein said diol contains from about 3 to 10 carbon atoms in the molecule.

9. Method as defined by claim 7 wherein said composition contains from about 0.5 to 1.5% by weight of 1,3 butanediol.

10. Method as defined by claim 7 wherein said composition contains from about 0.5 to 1.5% by weight of 1,3 heptanediol.

11. Method as defined by claim 7 wherein said composition contains from about 0.5 to 1.5% by weight of 1,3,5 hexanetriol.

References Cited
UNITED STATES PATENTS 3,556,804    1/1971    Conn et al. _____ 99—91 X A. LOUIS MONACELL, Primary Examiner J. R. HOFFMAN, Assistant Examiner U.S. Cl. X.R.

99—91, 92 150 R